Sept. 26, 1939.  S. R. LARGE  2,174,325
ANTIFRICTION BEARING
Filed June 11, 1937
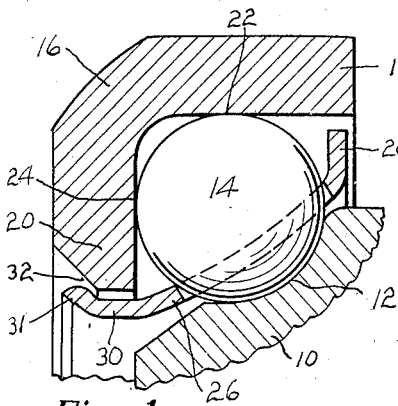
Fig. 1
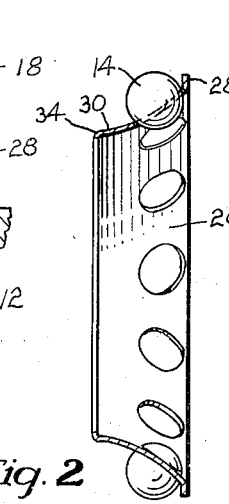
Fig. 2
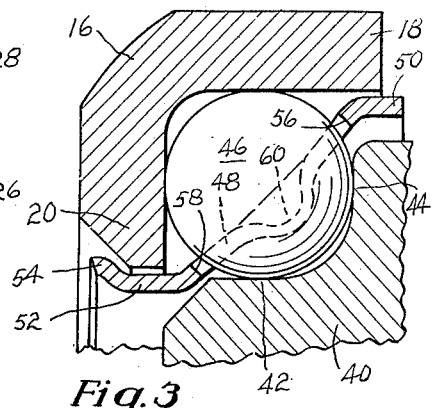
Fig. 3
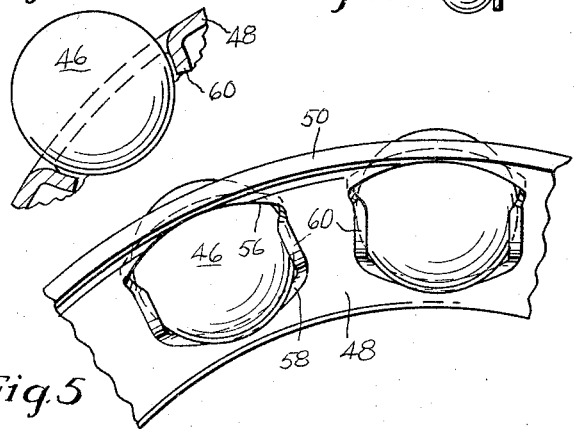
Fig. 4
Fig. 5
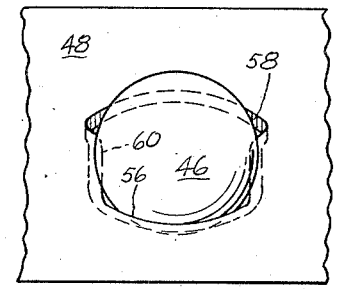
Fig. 6
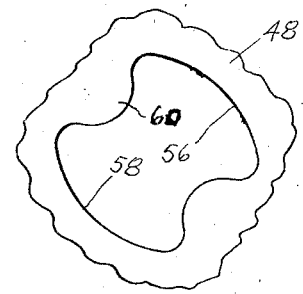
Fig. 7
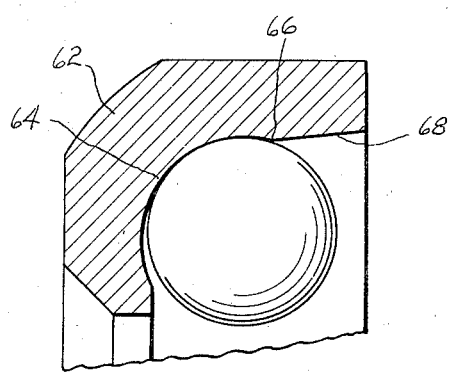
Fig. 8
INVENTOR:
SAMUEL R. LARGE,
BY Gales P. Moore
HIS ATTORNEY.

Patented Sept. 26, 1939

2,174,325

UNITED STATES PATENT OFFICE 2,174,325

ANTIFRICTION BEARING

Samuel R. Large, Bristol, Conn., assignor to General Motors Corporation, Detroit, Mich., a corporation of Delaware Application June 11, 1937, Serial No. 147,722

5 Claims. (Cl. 308—195)

This invention relates to antifriction bearings and comprises all of the features of novelty herein disclosed. An object of the invention is to provide an improved unit-handling bearing assembly, especially of a race ring, separator and rolling elements. Another object is to provide a race ring, separator and rolling elements with improved means to hold them against separation after assembly. Another object is to provide an improved separator for antifriction bearings. Another object is to provide an improved method of assembling and holding assembled the parts of an antifriction bearing.

To these ends and also to improve generally upon devices of this character, the invention consists in the various matters hereinafter described and claimed. In its broader aspects, the invention is not necessarily limited to the specific constructions selected for illustrative purposes in the accompanying drawing in which:

Fig. 1 is an axial section of a portion of an antifriction bearing.

Fig. 2 is an axial section of the separator.

Fig. 3 is an axial section of a portion of a modified form of bearing.

Fig. 4 is a sectional view peripherally of the separator of Fig. 3 at one of the ball pockets.

Fig. 5 is a side elevation of a portion of the separator.

Fig. 6 is a radial elevation of a ball pocket as seen from the outside.

Fig. 7 is a view of a ball pocket opening when initially punched.

Fig. 8 is a sectional view of a modified form of outer race ring.

Referring to Figs. 1 and 2, the numeral 10 indicates an inner race member or shaft provided with an angular contact arcuate groove or raceway 12 for a row of rolling elements, herein indicated as balls 14. An outer race ring 16 of generally angular cross section has an axial flange 18 and a radial flange 20, these flanges having straight raceways 22 and 24 which have contact points 22 and 24 preferably spaced ninety degrees apart with respect to the ball center. The outer race ring 16 is preferably made from flat stock swaged or pressed into angular form, the outside surface of the flange 18 being ground to size and the raceways 22 and 24 being carburized and finished by sand blasting.

The separator comprises a flaring ring or body portion 26 which is slightly curved in cross section and extends diagonally of the angular race ring 16. The body portion or wall 26 has a series of openings for the balls, the openings being smaller than the balls and the ring lying inside of the ball centers. At one end of the body portion is an outwardly projecting radial flange 28 directed toward the race flange 18 and contained within it. At the other end of the body portion is an axially projecting flange 30 terminating in an outwardly projecting retaining rib or flange 31 which enters a recess formed by a chamfered surface or incline 32 at the end of the race flange 20. As shown in Fig. 2, the flange 30 initially has an inwardly projecting rib 34 and the balls are assembled in the separator openings when the separator is clear of the race ring. Then the assembled balls and separator are placed within the race ring and the rib or flange is expanded to radially overlap the race flange 20 and retain the separator, balls and race ring as a unit-handling assembly. Otherwise stated, the body wall 26 and the rib 31 form a channel which interlocks with the flange 20 to prevent the outer race ring, separator and balls from coming apart when handled as a unit independently of an inner race member.

In Fig. 3, the inner race member or shaft 40 has a grooved raceway provided with two widely spaced points of contact 42 and 44 with the balls 46 while the outer race ring is the same as that of Fig. 1. The separator ring has a flaring body portion 48 extending diagonally between the flanges 18 and 20 and provided at one end with an axial flange 50 extending between the shaft and the flange 18. The other end of the separator has an axial flange 52 and a retaining rib or flange 54 as in Fig. 1. The pockets or openings for the balls are pierced as indicated in Fig. 7, the opposite side edges 56 and 58 preferably being arcuately curved on a radius larger than that of the balls and the centers of curvature being non-coincident. The ball openings or pockets at what may be termed the front and rear edges are initially provided with lugs 60. These lugs are then bent inwardly to closely embrace the balls and retain them from inward escape in the absence of the shaft or inner race member 40. The balls clear the edges 56 and 58 and in operation engage the guiding and retaining lugs 60 along a limited area inside of their circular path of travel. By bending the lugs from the central area of the body wall 48, they can project part way into the annular groove of the race member 40, thereby providing extra clearance.

In Fig. 8, the outer race ring 62 has an arcuate raceway 64 which is extended around the balls past the central plane thereof to the point 66 where the raceway meets an inclined wall 68 to form a snap rib. This rib will tend to retain the balls within the outer race ring when a separator of the form of Fig. 2 or Fig. 3 is assembled with them. The race ring gives a single point of angular contact and it is preferably machined and ground from bar stock.

I claim:

1. In a device of the character indicated, a race ring and a separator ring arranged one within the other, a series of rolling elements engaging the race ring, the separator ring having pocket openings smaller than the rolling elements to prevent escape of the rolling elements away from the race ring, the race ring being of angular section to provide separated points of contact with the rolling elements and having at one end a flange extending substantially radially towards the separator ring, the end portion of the flange being chamfered to provide a recess on the side opposite to the rolling elements, the body portion of the separator ring being flared and arranged on the opposite sides of the centers of the rolling elements from the race ring, and the separator ring clearing the race ring and having an integral retaining rib radially overlapping the flange and having running clearance in the recess of said flange; substantially as described.

2. In a device of the character indicated, a race ring having an axial flange and a radial flange, a series of rolling elements engaging the race ring, a separator ring having a flaring body portion extending diagonally from said radial flange to said axial flange and in clearance relation to said flanges, the body portion having openings for the rolling elements, and the separator ring having a terminal flange extending across the end of said radial flange and bent to radially overlap it with running clearance; substantially as described.

3. In a device of the character indicated, a grooved race member providing a raceway, a cooperating angular race member having a raceway, a series of rolling elements engaging the raceways, a separator ring having a flaring body wall lying on that side of the rolling element centers adjacent to the grooved race member and having openings for the rolling elements, the side edges of the openings clearing the rolling elements the front and rear edges of the openings having lugs bent towards the groove of the race member and conforming to the surfaces of the rolling elements on that side of the rolling element centers opposite to said angular race member; substantially as described.

4. In a device of the character indicated, a race ring having an axial flange and a radial flange lying at substantially right angles, a series of rolling elements engaging the race ring, a separator ring having a flaring body wall extending diagonally from a point adjacent to the end of the axial flange to a point adjacent to the end of the radial flange, the body wall lying on that side of the rolling element centers remote from the race ring and having pocket openings smaller than the rolling elements, the separator ring having an axial flange extending across the end of the radial flange in clearance relation thereto, and a retaining projection carried by the axial flange of the separator and radially overlapping a portion of the radial flange in clearance relation thereto; substantially as described.

5. In a device of the character indicated, a race member having an axial flange and a radial flange lying substantially at right angles, a grooved race member projecting within the axial flange, rolling elements, a separator ring between the race members and in clearance relation to both, the separator ring having a flaring body wall extending diagonally from a point adjacent to the end of the axial flange to a point adjacent to the end of the radial flange, the smaller end of the separator ring having an axial flange extending across and within the end of the radial flange, a retaining flange carried by the axial flange of the separator and projecting outwardly to radially overlap a portion of said radial flange, and the body wall of the separator having pocket openings with lugs bent inwardly towards the groove of the grooved race member; substantially as described.

SAMUEL R. LARGE.